United States Patent [19]
Edlund

[11] Patent Number: 4,819,952
[45] Date of Patent: Apr. 11, 1989

[54] SEALING AND WIPER ARRANGEMENT

[75] Inventor: Roy Edlund, Stuttgart, Fed. Rep. of Germany

[73] Assignee: Busak + Luyken GmbH & Co., Stuttgart, Fed. Rep. of Germany

[21] Appl. No.: 149,425

[22] Filed: Jan. 29, 1988

[30] Foreign Application Priority Data

Feb. 2, 1987 [DE] Fed. Rep. of Germany ....... 3702977

[51] Int. Cl.$^4$ .............................................. F16J 15/32
[52] U.S. Cl. .................... 277/165; 277/152; 277/206 A
[58] Field of Search ............... 277/165, 152, 206 R, 277/206 A, 207 R, 208

[56] References Cited

U.S. PATENT DOCUMENTS

| | | | |
|---|---|---|---|
| 2,873,132 | 2/1959 | Tanner | 277/206 A X |
| 3,418,001 | 12/1968 | Rentschler et al. | 277/206 A X |
| 3,663,024 | 5/1972 | Traub | 277/165 |
| 4,577,874 | 3/1986 | Zitting | 277/165 |
| 4,709,932 | 12/1987 | Edlund et al. | 277/165 |

FOREIGN PATENT DOCUMENTS

| | | |
|---|---|---|
| 3207327 | 9/1983 | Fed. Rep. of Germany . |
| 3418898 | 11/1985 | Fed. Rep. of Germany ...... 277/165 |
| 3521525 | 11/1986 | Fed. Rep. of Germany ...... 277/165 |
| 2177464 | 1/1987 | United Kingdom ................ 277/165 |

Primary Examiner—Robert S. Ward
Attorney, Agent, or Firm—Cohn, Powell & Hind

[57] ABSTRACT

In a sealing and wiper arrangement, a sealing ring (5), which may also serve a wiper function, and a stressing ring arrangement (6) are accommodated in a groove (4) of a first machine part (1). The stressing ring arrangement (6) is positioned between the sealing ring (5) and the base of the groove and urges the sealing ring against the surface of a second machine part (2) which is capable of a movement relative to the first machine part (1), in a direction perpendicular to the direction of the groove (4). The sealing ring (5) is in contact with a second machine part (2) by a wiper web (8) and an edge (11) provided on its high-pressure side. The edges (10, 11) provided on the sealing ring (5) are loaded independently of each other. This is achieved by giving the stressing ring arrangement (6) the form of two separate portions of a stressing ring. In one embodiment two completely separate stressing rings (61, 62) are provided. In another embodiment a Quad-ring (40) is provided.

14 Claims, 1 Drawing Sheet

SEALING AND WIPER ARRANGEMENT

BACKGROUND OF THE INVENTION:

The present invention relates to a sealing and wiper arrangement comprising a sealing ring made from a tough elastic material fitted in the groove of one of two machine parts which are movable relative to each other in a direction perpendicular to the said groove, and a stressing ring arrangement made from a rubber-elastic material, arranged between the sealing ring and the base of the groove and loading the sealing ring in the radial direction, the sealing ring being provided near its ends with edges resting against the other machine part, both edges acting in operation simultaneously as sealing edges and defining an annular space which extends concentrically relative to the sealing ring and which is sealed off from both, the high-pressure area on the one side of the arrangement and the low-pressure area on the other side of the arrangement, at least one of the said edges being formed by the line of intersection of two conical surfaces rising in opposite directions. An arrangement of this type is produced and sold by applicant (patent holder) as a double wiper arrangement under the name "Turcon-Excluder 2" for which a trade-mark has been registered. The sealing ring of this known double wiper arrangement is provided, at its end on the low-pressure side, with a wiper web of substantially rectangular cross-section comprising a flat surface portion which rests against the circumference of the other machine part. Accordingly, the edge is formed by the line of intersection between this flat surface section and the inner flank of the wiper web. The stressing ring is formed by an O ring arranged substantially symmetrically to the plane defined by the inner flank of the wiper web. The 0 ring is received by an annular groove opening towards the end face of the sealing ring.

Double wiper arrangements of this type are in use in particular in hydraulic piston-and-cylinder units where the sealing ring and the stressing ring are incorporated in the rod guide. In this case, the double wiper arrangement is preceded on the high-pressure end by one or more sealing ring arrangements so that the function of the sealing ring of the double wiper arrangement is substantially reduced to wiping off any contaminations sticking to the outer portion of the rod so as to prevent them from penetrating into the sealing area proper. The outer wiper lip, which in the case of the double wiper arrangement of the type described above is formed by the wiper web of substantially rectangular cross-section, is sufficiently rigid to remove even larger dirt particles safely from the rod surface. At the same time, however, the lip also has to be sufficiently tight to wipe off safely any oil and grease present on the rod. Further, the sealing ring is required to prevent any fluid leaking through the preceding sealing arrangement from penetrating to the outside.

The double wiper arrangements known heretofore do not satisfy all these requirements as desired. One has therefore tried to improve the efficiency of the double wiper arrangement by installing it in the groove at a certain initial stress and by giving the space accommodating the stressing ring a shape tapering towards the end of the sealing ring, in an attempt to achieve a predetermined distribution of forces along the surface portion resting flat against the other machine part. Although a considerable improvement of the combined wiping and sealing behavior has already been achieved by these measures, the arrangement still does not seem optimally suited for all purposes.

SUMMARY OF THE INVENTION

Now, it is the object of the present invention to improve a sealing and wiper arrangement of the before-described type in such a manner that a perfect barrier is obtained for both, leaking fluid and penetrating foreign bodies of all types.

According to the invention, this object is achieved by an arrangement in which the stressing ring structure comprises two portion, each of them loading substantially one of the two edges.

The arrangement according to the invention makes it possible, by sizing the stressing ring arrangement appropriately, to load the two edges located near the ends of the sealing ring substantially independently of each other so that they serve their respective purposes in the best possible manner. The possibility to load the two edges independently of each other provides the additional advantage that the two edges or, more precisely, the two webs forming the edges may also be given different designs so as to adapt their cross-sectional shape optimally to the respective application. The invention therefore permits to produce sealing and wiper arrangements which provide very high safety against the penetration of dirt particles, i.e. very high wiping efficiency, even under extremely severe conditions, while the inner edge forms at the same time a very efficient barrier for any fluid that may leak through the preceding seals, and might even be used as the sole seal. Arrangements of this type may, selectively, also be designed as inwardly or outwardly sealing seal and wiper arrangements.

As results already from the above explanations, the invention permits a great variety of different embodiments of the sealing and wiper arrangements. For example, different forms are obtained when the stressing ring arrangement is formed either by a single stressing ring, or else by two separate stressing rings. If a single stressing ring is used, it may in particular have Quad-ring cross-sectional shape, although other cross sections are also imaginable. A one-piece stressing ring may, for example, exhibit a cross-section resembling that of two halves of an O ring arranged side by side.

While the use of only one stressing ring leads to simple structures, the use of two separate stressing rings may open up additional design possibilities for the sealing and wiper arrangement, in particular as regards the separate rating of the loading of the edges. In addition, the use of two separate stressing rings enables the sealing ring to be provided, on the side facing the stressing rings, with a separating web projecting between the two stressing rings Such a separating web makes it possible to define the position of the two stressing rings with greater precision and offers in addition the particular advantage that the sealing ring may be very thin-walled as it is given sufficient rigidity by the separating web. This arrangement does not only help save material, but permits also to make the groove, which accommodates the sealing and wiper arrangement, less deep—a fact which may prove advantageous with respect to the design of the machine parts to be sealed off from each other. In addition, the rigidity of the portions of the sealing ring carrying the edges is reduced so that the contact forces between the edges of the sealing ring and the machine part are largely determined by the stressing rings. As regards the introduction of the forces and the defined position of the stressing rings, particularly advantageous conditions are obtained when the contact surface at the sealing ring for at least one stressing ring is designed to rise from the separating web towards the stressing ring.

In order to provide improved rigidity to the sealing ring it may also be convenient to provide, either instead of or in addition to the separating web, a supporting web located in the area between the two edges of the sealing ring and resting against the other machine part. While such a supporting web is not loaded by very high forces, because the forces exerted by the stressing ring arrangement are directed substantially upon the edges arranged on both sides of the supporting web, it prevents the sealing ring from assuming unstable positions and, in particular, from collapsing in its central area. The supporting web may have any desired cross-section, including in particular a substantially rectangular cross-section comprising a surface portion resting flat against the other machine part. The use of such a cross-section provides the advantage that its load-carrying surface is relatively large, so that no extremely high surface pressures will be encountered, which would be very undesirable at this point. In particular when a central supporting web is used, the sealing and wiper arrangement may be given a symmetrical design, relative to its longitudinal central plane. In this case, edges would be formed on both ends of the sealing ring by the line of intersection between two conical surfaces rising in opposite directions.

As has been explained before, the invention starts out from a prior-art double wiper arrangement which comprises a wiper web of substantially rectangular cross-section, which is arranged at the low-pressure end of the sealing ring and which rests against the other machine part by a flat surface portion. A sealing ring of this design also provides the possibility to use a stressing ring arrangement comprising two portions loading each substantially one of the two edges which are also found on a sealing ring of this type. When the sealing ring is designed in this manner, the action of the stressing ring or of the stressing ring portion loading the edge located at the inner flank of the rectangular wiper web can be supported or reduced if the flat surface portion does not, in the relaxed condition of the sealing ring, extend cylindrically, but forms instead an angle of up to 15° with the cylindrical surface defined by the other machine part. Depending on the direction of the angle, the effect of the stressing ring is thereby reduced or increased, and a defined pressure gradient can be adjusted along this surface, just as in the case of the double wiper arrangement according to U.S. Pat. No. 4,709,932. The arrangement according to the invention permits, however, in addition to adjust a defined contact pressure along the edge at the high-pressure side.

In the case of the sealing and wiper arrangement according to the invention, the pressure fluid passing the edge at the high-pressure side of the sealing ring is wiped off by the outer edge of the arrangement, so that a certain quantity of the pressure fluid will accumulate between the two edges. This quantity is directly dependent on the thickness of the lubricating film passing the edge on the high-pressure side and on the length of the movement performed by the two machine parts relative to each other. If troublefree operation is to be ensured, the space between the two edges must be large enough to accommodate the fluid quantity accumulating during one stroke, even though the same quantity of fluid is carried back to the high-pressure side during the return stroke. The particular design of the sealing and wiper arrangement according to the invention, where the inherent rigidity of the sealing ring is not of decisive importance, enables the wall portions of the sealing ring to be made very thin so that at least one groove can be provided which forms the continuation of the inner conical surface of the sealing ring provided at least adjacent the edge on the high-pressure side, and which provides an enlarged oil space.

A particular problem of all wiper arrangements is seen in the quantity of dirt accumulating on the outside of the wiper lip. The dirt that has been wiped off may be transported radially along the outside of the wiper lip and into the sealing and wiper arrangement, where it may get between the sealing ring and the base of the groove and give rise to leaks or damage the stressing ring. The present invention provides a remedy for this drawback, too. This remedy consists of a projection provided at the low-pressure end of the sealing ring and extending at least nearly down to the base of the groove to form a dirt seal. Such a projection prevents any dirt from penetrating into the area of the rubber-elastic stressing ring and protects the arrangement in this manner from damage. The projection forming the dirt seal is particularly effective if an annular groove is provided on its outside, near its end, so that an elastic lip is formed at the end of the projection, which can apply itself in a sealing manner against the base of the groove, but which also permits larger quantities of dirt to accumulate, while having simultaneously the effect to guide the dirt off and out of the base of the groove.

The invention will now be described and explained in greater detail with reference to the embodiment shown in the drawing. The features shown and described in the specification and the drawing may be used in other embodiments of the invention either individually or in any desired combination thereof.

DESCRIPTION OF THE PREFERRED EMBODIMENT

Figure 1:
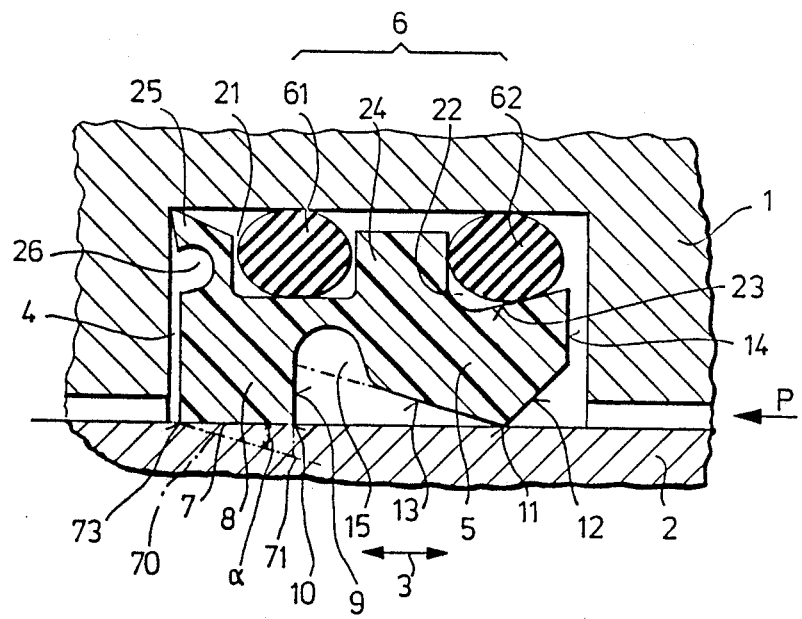
FIG. 1 shows a cross-section through a sealing and wiper arrangement according to the invention, in greatly enlarged scale.

The sealing and wiper arrangement shown in FIG. 1 serves for wiping off dirt from a machine part 2 at its low-pressure end, and, at its high-pressure end, for wiping off leakage fluid in the gap between the two machine parts 1 and 2 which, in operation, move axially relative to each other in the direction indicated by arrow 3. Typically, the machine part 2 is the rod, the machine part 1 the cylinder of a hydraulic piston-and-cylinder unit. The described arrangement is of the inwardly sealing type, but an outwardly sealing arrangement can also be provided in a corresponding manner.

An annular groove 4 recessed into the machine part 1 perpendicularly to the sense of movement 3 accommodates a sealing ring 5 and a stressing ring arrangement 6 formed by two stressing rings 61, 62. The sealing ring 5 consists of a tough-elastic synthetic material, for example a polyurethane or a filled polytetrafluoro ethylene. It is provided, on its running surface facing the other machine part 2, with a first surface portion 7 resting flat against the other machine part 2 and being formed by the end of a wiper web 8 of rectangular cross-section, with an edge 10 being formed between the inner flank 9 of the said wiper web 8 and the surface portion 7 which is in contact with the machine part 2.

Another edge 11 is formed at the other end of the sealing ring 5 by the line of intersection between two conical surfaces 12, 13. One of the conical surfaces 12 extends to the end face 14 of the sealing ring 5 on the high-pressure side, while the other conical surface 13 ends in an inner groove 15 located in the area between the end of the inner conical surface 13 and the flank 9 of the wiper web 8.

The side of the sealing ring 5 which faces the base of the groove 4 is provided with a first groove 21 arranged approximately symmetrically relative to the plane defined by the inner flank 9 of the wiper web 8, and receiving a stressing ring 61. In addition, a recess 22 for receiving the stressing ring 62 is provided on the high-pressure end of the sealing ring 5 in an arrangement such that the stressing ring 62 is positioned substantially symmetrically relative to the plane define by the edge 11 of the sealing ring 5. The recess 22 extends right to the end face 14 of the sealing ring on the high-pressure side and is provided with a contact surface 23 for the stressing ring 62 which rises towards the end of the sealing ring in the direction of the stressing ring 62 so that the stressing ring 62 is urged towards the separating web 24 defined by the groove 21 and the recess 22. In addition, a projection 25 is provided on the low-pressure side of the sealing ring 5. The projection 25 extends right to the corner of the annular groove 4 in the first machine part 1 and forms on the one hand the outer boundary of the groove 21 for the stressing ring 61, while serving on the other hand to protect that portion of the groove 4 which accommodates the rubber-elastic stressing rings 61, 62 from dirt that may be wiped off by the wiper web 8 from the surface of the other machine part 2 during the latter's stroke and might show a tendency to move along the end face of the wiper ring and into the groove 4. The projection 25 serving as dirt seal is provided on its outside, near its end, with an annular groove 26 so that its outer portion forms an elastic lip applying itself tightly against the flank or the base of the annular groove 4 receiving the arrangement. In addition, the annular groove 26 provided in the projection 25 offers additional space for accommodating any dirt particles.

It will be seen without any difficulty that the arrangement illustrated in FIG. 1 provides the possibility, by appropriate selection of the dimensions of the material for the stressing rings 61, 62, to load the edges 10 and 11 of the wiper ring 5 in a defined manner and to produce in this manner those contact pressures which provide optimum conditions for the respective application. The rectangular cross-section of the wiper web 8 ensures in this connection that sufficiently high axial forces can be exerted by the sealing ring to remove even heavy contaminations from the other machine part 2. At the same time, the stressing ring 61 enables a defined force to be exerted upon the inner edge of the same wiper web, which ensures that any residues of pressure fluid that may pass the other edge 11 are safely retained. The space defined by the conical surface 13 and enlarged by the inner groove 15 suffices to accommodate even the quantity of leakage fluid passing the edge 11 in the case of a very long stroke, and this the more as the sealing force exerted by the sealing edge 11 can be adjusted very exactly to the value optimally suited for the particular application, by means of the stressing ring 62. It should be noted in this connection that the inner groove 15, which serves to receive any leakage fluid, forms sort of a hinge between the wiper web 8 of rectangular cross-section and the portion of the sealing ring 5 provided with the sealing edge 11 so as to ensure that the sealing force exerted by the edge 11 is determined almost exclusively by the force of the stressing ring 62. This particular design also enables the sealing ring to be made very flat, i.e. its radial extension to be kept very small; and the fact that the stressing ring arrangement is subdivided into two stressing rings permits the use of stressing rings 61, 62 of relatively small diameters, with the result that the sealing and wiper arrangement requires only little space so that the groove 4 to be recessed into the machine part 1 also may be given a relatively small cross-section. This possibility offered by the invention, namely to give the sealing and wiper arrangement optimized dimensions, combined with the protection against penetrating dirt obtained by the projection 25, ensure that a sealing and wiper arrangement of this type provides a maximum of efficiency combined with maximum service life.

Figure 2:
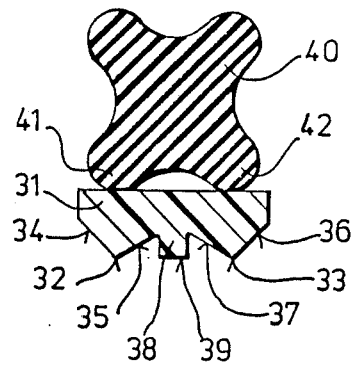
FIG. 2 shows a cross-section through the sealing and stressing rings of another sealing and wiper arrangement according to the invention, in the relaxed condition and in less enlarged scale, as compared with FIG. 1.

FIG. 2 shows an embodiment of the invention in which the sealing ring 31 is provided near its two ends with edges 32, 33 each formed by the line of intersection between two conical surfaces 34, 35, and 36, 37, respectively, rising in opposite senses. The two inner conical surfaces 35, 37 include between them a supporting web 38 exhibiting a substantially rectangular cross-section and resting against the other machine part by a flat surface portion 39 It is apparent from the drawing that the described arrangement is symmetrical relative to the longitudinal center plane of the wiper ring 31. The wiper ring 31 is loaded by a substantially X-shaped O-ring or Quad-ring 40, with lobed or bulbous corners providing bead-shaped portions 41, 42, which are-in contact with the wiper ring 31, are located substantially in the same radial plane as the edges 32 and 33 so that defined stressing forces are again exerted in the area of these edges.

It appears from the embodiments shown in the drawing that the invention permits many different designs of a sealing and wiper arrangement, all of which have in common that their edges which are important for the sealing and wiping effect are loaded with defined pressures so that one achieves the best possible wiping effect towards the outside and the best possible sealing effect towards the inside. For example, it would also be possible to give the supporting web 38 of the embodiment shown in FIG. 2 a triangular cross-section, instead of a rectangular one. Or the said supporting web may be dropped altogether, in which case the space between the edges 32, 33 can even be increased by an inner groove if a particularly large quantity of sliding oil has to be accommodated. If two stressing rings are used, which bear against the flanks of the recesses in which they are accommodated, the force introduced into the sealing ring by the stressing ring can be directed exactly upon the particular edge to be loaded, by giving the flanks an appropriate inclination. This refers not only to the flanks which extend substantially parallel to the axis and which correspond to the contact surface 23 in FIG. 1, but also to the flanks extending substantially in the radial sense, which may be formed for example by the more or less inclined lateral surfaces of a central web. Further, it would be possible in the case of the embodiment of FIG. 1 to give the surface portion 7 of the wiper web 8 which is in contact with the machine part 2 a certain inclination, in the relaxed condition of the sealing ring, relative to the cylindrical surface defined by the machine part 2, as indicated in FIG. 1 by the dash-dotted line 70. This angle may, preferably, have a value of maximally 15° and may open either in the sense indicated in FIG. 1, or in the opposite sense. In the case of the embodiment shown in FIG. 1, the inner edge 71 of the wiper web 8 overlaps the cylindrical surface defined by the machine part 2 whereby the contact pressure produced by the stressing ring 61 is increased still further. In the installed condition of the arrangement, one therefore obtains a higher pressure gradient between the inner edge 71 and the outer edge 73 of the flat surface portion 7. However, if only a very small gradient of the pressure forces is desired along the surface portion 7, the inclination may be directed in the other sense so that when the sealing ring 5 is deformed, increased contact pressure is obtained in the area of the outer edge 73 so that the decrease of the contact pressure resulting from the particular design and arrangement of the stressing ring is compensated to a certain degree. Considering that the invention permits to optimize the sealing and wiper arrangements, the use of such arrangements makes it possible to simplify considerably the sealing arrangements usually arranged before the conventional wiper arrangements. This simplification, in particular the fact that one or more of the sealing rings which follow each other in the axial direction, can be left away, leads not only to savings as regards the sealing rings as such, but enables the constructional length of hydraulic piston-and-cylinder units to be considerably reduced in the guiding and sealing area, whereby very considerable savings are achieved The broad range of possible designs as described in the above specification enables the arrangement to be optimally adapted to the most different operating conditions so that the present invention provides the man of the art with novel means for designing sealing and wiper arrangements which offer the possibility to simplify and reduce the cost of hydraulic piston-and-cylinder units very significantly.

I claim as my invention:

1. Sealing and wiper arrangement comprising a sealing ring made from a tough elastic material fitted in a groove of one of two machine parts which are movable relative to each other in a direction perpendicular to the said groove, and a stressing ring arrangement made from a rubber-elastic material, arranged between the sealing ring and the base of the groove and loading the sealing ring in the radial direction, the sealing ring being provided near its ends with edges resting against the other machine part, both edges acting in operation simultaneously as sealing edges and defining an annular space which extends concentrically relative to the sealing ring and which is sealed off from both the high-pressure area on the one side of the arrangement and the low-pressure area on the other side of the arrangement, at least one of said edges being formed by the line of intersection of two conical surfaces rising in opposite directions, characterized in that the said stressing ring structure comprises two portions, each of them loading substantially one of the said two edges.

2. Sealing and wiper arrangement according to claim 1, characterized in that the said stressing ring structure is formed by a single stressing ring exhibiting beads in the area of the radial planes defined by the edges, the said beads producing increased stressing forces in the area of the said planes.

3. Sealing and wiper arrangement according to claim 2, characterized in that the said single stressing ring is a Quad-ring.

4. Sealing and wiper arrangement according to claim 1, characterized in that the said stressing ring structure comprises two separate stressing rings, each of them being provided in the area of a plane defined by the said two edges.

5. Sealing and wiper arrangement according to claim 4, characterized in that the said sealing ring is provided, on its side facing the said stressing rings, with a separating web projecting between the two stressing rings.

6. Sealing and wiper arrangement according to claim 5, characterized in that the contact surface on the sealing ring for at least one stressing ring rises from the said separating web towards the said stressing ring.

7. Sealing and wiper arrangement according to claim 1, characterized in that the said sealing ring is provided in the area between the two edges with a supporting web resting against the other machine part.

8. Sealing and wiper arrangement according to claim 7, characterized in that the said supporting web exhibits a substantially rectangular cross-section and comprises a surface portion which rests flat against the said other machine part.

9. Sealing and wiper arrangement according to claim 1, characterized by a symmetrical arrangement, relative to its longitudinal center plane.

10. Sealing and wiper arrangement according to claim 1, characterized in that the edge provided at the low-pressure end of the said sealing ring is formed by the line of intersection between the inner flank and the flat surface portion of a wiper web of substantially rectangular cross-section, which is provided at the end of the said sealing ring and which rests against the other machine part.

11. Sealing and wiper arrangement according to claim 10, characterized in that in the relaxed condition of the sealing ring the said flat surface portion forms an angle of up to 15° with the cylindrical surface defined by the said other machine part.

12. Sealing and wiper arrangement according to claim 1, characterized in that at least one inner conical surface of the said sealing ring ends in a groove forming an enlarged oil space.

13. Sealing and wiper arrangement according to claim 1, characterized in that the said sealing ring is provided on its low-pressure end with a projection extending at least nearly to the base of the groove and forming a dirt seal.

14. Sealing and wiper arrangement according to claim 13, characterized in that the projection constituting the said dirt seal is provided with an annular groove on its outside near its end.

* * * * *

UNITED STATES PATENT AND TRADEMARK OFFICE
CERTIFICATE OF CORRECTION

PATENT NO. : 4,819,952

DATED : April 11, 1989

INVENTOR(S) : Roy Edlund

It is certified that error appears in the above-identified patent and that said Letters Patent is hereby corrected as shown below:

First page [54] delete "SEALING AND WIPER ARRANGEMENT" and insert --FLUID SEALING RING AND WIPER ASSEMBLY--

Column 1, delete the title "SEALING AND WIPER ARRANGEMENT" and insert --FLUID SEALING RING AND WIPER ASSEMBLY--

Column 1, line 36, delete "0" and insert --O--
Column 2, line 55, after "rings" insert --.--
Column 5, line 1, delete "polytetrafluoro" and insert --polytetrafluor--
Column 6, line 36, after "39" insert --.--
Column 6, line 41, delete "are-in" and insert --are in--
Column 7, line 38, after "achieved" insert --.--
Column 7, line 60, after "both" insert --,--

Signed and Sealed this

Ninth Day of January, 1990

Attest:

JEFFREY M. SAMUELS

Attesting Officer  Acting Commissioner of Patents and Trademarks